United States Patent [19]

Nakane et al.

[11] Patent Number: 5,007,038
[45] Date of Patent: Apr. 9, 1991

[54] METHOD AND APPARATUS FOR PRODUCING AN ACCURATE ERROR SIGNAL IN AN OPTICAL RECORDING MEDIUM DRIVER

[75] Inventors: Kazuhiko Nakane; Teruo Furukawa; Masayoshi Shimamoto; Kyosuke Yoshimoto, all of Amagasaki, Japan

[73] Assignee: Mitsubishi Denki Kabushiki Kaisha, Tokyo, Japan

[21] Appl. No.: 226,722

[22] Filed: Aug. 1, 1988

[30] Foreign Application Priority Data

Aug. 4, 1987 [JP] Japan .............................. 62-195691

[51] Int. Cl.$^5$ ................................................ G11B 7/00
[52] U.S. Cl. .................... 369/44.11; 369/44.36
[58] Field of Search .................... 369/44-46, 369/54, 106, 116; 250/201, 202, 205

[56] References Cited

U.S. PATENT DOCUMENTS 4,663,749 5/1987 Bierhoff et al. ................. 369/111 X
4,796,250 1/1989 Kobayashi et al. ................ 369/54

FOREIGN PATENT DOCUMENTS 095766 5/1983 European Pat. Off. .
1-7329 1/1989 Japan .................................... 369/45

Primary Examiner—Robert L. Richardson
Attorney, Agent, or Firm—Wolf, Greenfield & Sacks

[57] ABSTRACT

When recording, reproducing or erasing data signal by illuminating a recording medium surface with a condensed light spot, a tracking sensor signal or a focusing sensor signal is detected from light reflected from the recording medium surface. The detected signal is subjected to current-to-voltage conversion, and the current-to-voltage conversion gain is switched by estimating reflected light power from the recording medium surface.

20 Claims, 4 Drawing Sheets

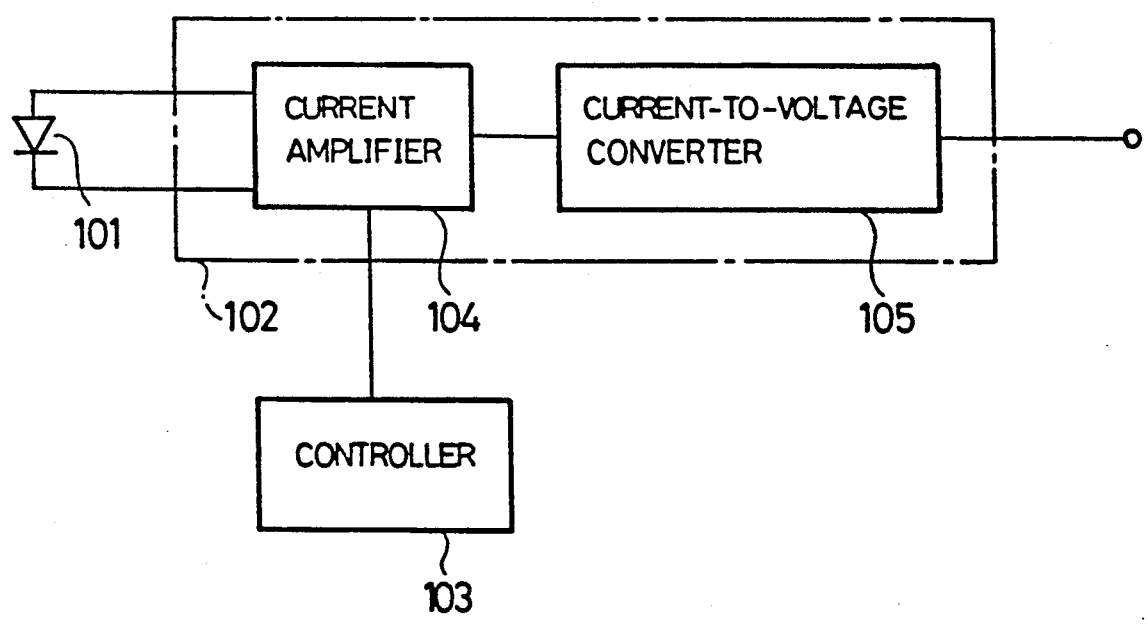
F I G. 1

METHOD AND APPARATUS FOR PRODUCING AN ACCURATE ERROR SIGNAL IN AN OPTICAL RECORDING MEDIUM DRIVER

BACKGROUND OF THE INVENTION

1. Field of the Invention

This invention relates to a method of driving a recording medium such as an optical disk or a magneto-optical disk and, more particularly, to a method of detecting an sensor signal for a tracking servo mechanism and a focusing servo mechanism and amplifying the detected signal.

2. Description of the Prior Art

In an optical disk system or a magneto-optical disk system, usually light power of low intensity is provided for illumination when reproducing data, while light power of high intensity is provided for illumination when recording data. An error signal used for light spot tracking servo or focusing servo utilizes light reflected by or transmitted through a disk. Therefore, with a change in light power the error signal is also changed. To obtain a stable servo signal, therefore, the level of the error signal is desirably constant irrespective of even a great change in the light power. To meet this end, it has been in practice to switch the gain of a preamplifier for amplifying a detector output in stages, one at the time of the reproduction and the other at the time of the recording. A specific example of such a system is disclosed in Japanese Patent Laid-Open Sho 60-22746. The basic structure of the system will be described with reference to FIG. 5.

Referring to the FIG. 5, reference numeral 1 designates a photo-sensor, 2 a differential amplifier for an out-of-track signal system, 3 and 5 amplifiers for providing a tracking servo drive signal to an output terminal 6, 7 a de-focus signal system differential amplifier, 8 and 10 amplifiers for providing a focus servo drive signal to an output terminal 11, 12 and 13 a total reflection light system inversion amplifier and a filter, respectively, and 4 and 9 are transistors provided between filter 13 and amplifiers 3 and 5. With such a prior art system the output current of the photo-sensor 1 is converted by an amplifier 2 into a voltage, which is then passed through an amplifier 3, which is capable of switching of the gain to one of two values, thus providing an error signal. In this case, by switching the gain of the amplifier 3 at the time of reproduction or recording, the error signal level can be held in a predetermined range, and a stable tracking servo signal can be obtained.

A focus servo signal can also be obtained in a similar way.

The prior art optical disk system has the above simple structure because no consideration is paid to the dealing of various different recording media by the same system. This is so because in this case the ratio of the magnitude of the photo-sensor output dealt with between the case of reproduction and the case of recording is about 1:10 so that the output voltages of the amplifiers 2 and 7 do not become less than the amplifier error at the time of the reproduction, at which time the output is low, and can be held within the amplifier output permissible range at the time of the recording, at which time the output is high. However, when consideration is paid to the dealing of various different recording media by the same system, the light power used for reproduction, recording and deletion varies with the individual media, and also the light reflectivity of the medium surface varies. Therefore, the reflected light power, which is the product of the illumination light power and light reflectivity, varies greatly. Consequently, the ratio between the minimum and maximum values of the sensor output amounts to one versus several hundred. For this reason, if again not less than the amplifier error is provided at the time of the low output, the gain at the time of the high output exceeds the output range. On the other hand, if a gain in the normal output range is provided at the time of the high output, at the time of the low output the gain is less than the error so that it becomes impossible to take out any signal.

SUMMARY OF THE INVENTION

The invention has been intended in order to preclude the above problems, and its object is to provide a method of permitting a high accuracy error signal to be obtained at all time for recording media having various reflectivities.

In the method of driving a recording medium with different reflectivity according to the invention, when a recording medium surface is illuminated by a condensed light spot for recording, reproduction of erasing or data, a tracking error signal or focusing error signal is detected from reflected light from the recording medium surface and subjected to current-to-voltage conversion, and the gain of the current-to-voltage conversion is switched by estimating the power of the reflected light from the recording medium surface.

In the drive method according to another aspect of the invention, the current-to-voltage conversion gain is switched according to the reflectivity of the recording medium.

In the drive method according to a further aspect of the invention, the gain noted above is switched according to the illumination light power illuminating the recording medium.

According to the invention, the current-to-voltage conversion gain is switched according to the output current of a sensor for detecting reflected light. For example, in a reproducing state, in which the output current is low, the gain is set to be high, while in a recording or deletion state, in which the sensor output current is high, it is set to be low. Further, in the recording or deletion state, it is set according to the value of the illumination light power for recording and deletion, i.e., it is set to be high when the power is low and set to be low when the power is high. Further, it is set to be high with a recording medium of low reflectivity and set to be low with a recording medium of high reflectivity.

With the above arrangement, the error signal can be handled in a normal operation range of the circuit, and highly accurate control can be obtained.

The above and other objects, features and advantages of the invention will become more apparent from the following description when the same is taken in conjunction with the accompanying drawings.

DESCRIPTION OF THE FIGURES

FIGS. 1 and 2 are a block diagram and a circuit diagram, respectively, showing one embodiment of the system for driving a recording medium according to the invention;

DESCRIPTION OF THE PREFERRED EMBODIMENT

Figure 2:
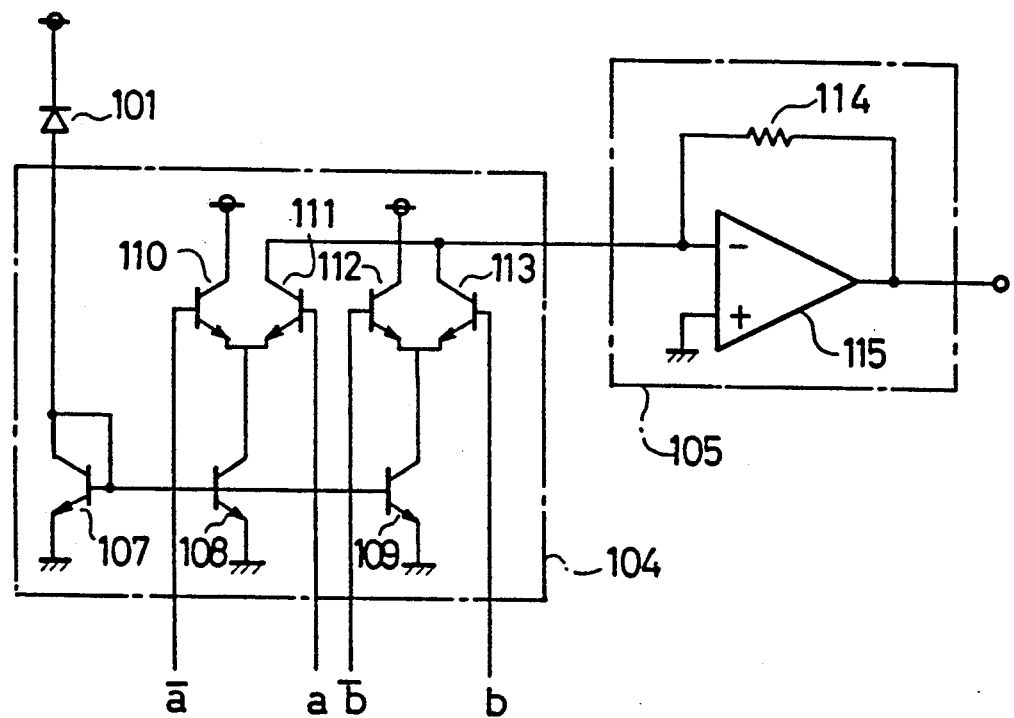

Now, an embodiment of the invention will be described with reference to FIGS. 1 and 2. FIG. 1 is a block diagram showing the embodiment of the recording medium drive system according to the invention, and FIG. 2 is a circuit diagram showing the system of FIG. 1 in detail. In the Figures, reference numeral 101 designates a photo-sensor for detecting reflected light from a recording medium, 102 a current-to-voltage conversion amplifier for converting the photo-sensor output current into a voltage to be provided as detection signal, 103 a controller for setting the current-to-voltage conversion gain of the amplifier 102, 104 a variable gain current amplifier, and 105 a current-to-voltage converter.

The current amplifier 104 includes a current mirror circuit consisting of transistors 107 to 109 and a current switch circuit consisting of differential transistor pairs 110, 111 and 112, 113. The current-to-voltage converter 105 consists of a feedback resistor 114 for current-to-voltage conversion and an operational amplifier 115.

Now, the operation of the system of FIG. 2 will be described.

The output current $I_{101}$ of the photo-sensor 101 is supplied to the transistor 107 of the current mirror circuit. Denoting the emitter areas and collector currents of the transistors 107 to 109 by $A_{107}$ and $Ic_{107}$, $A_{108}$ and $Ic_{108}$ and $A_{109}$ and $Ic_{109}$, from the well-known principal of operation of current mirror circuit there holds a relation $$\frac{Ic_{107}}{A_{107}} = \frac{Ic_{108}}{A_{108}} = \frac{Ic_{109}}{A_{109}} \quad (1)$$

Since $Ic_{107} = I_{101}$ $$Ic_{108} = \frac{A_{108}}{A_{107}} \cdot I_{101} \quad (2)$$

$$Ic_{109} = \frac{A_{109}}{A_{107}} \cdot I_{101}$$

By appropriately determining the emitter area ratios $A_{108}/A_{107}$ and $A_{109}/A_{107}$ of the transistors 107 to 109, the photo-sensor output current $I_{101}$ can be amplified with a desired gain. The collector current $Ic_{108}$ of the transistor 108 is supplied through a current switch consisting of the pair differential transistors 110 and 111, and the collector current $Ic_{109}$ of the transistor 109 is supplied through a current switch consisting of pair differential transistors 112 and 113. The sum of the collector currents $Ic_{111}$ and $Ic_{113}$ of the transistors 111 and 113 constitutes the output current $I_{104}$ of the current amplifier 104. Of the pair differential transistors 110 and 111 the one with the higher one of their base potentials $V_{B110}$ and $V_{B111}$ is rendered conductive while the other with the lower base potential is rendered non-conductive. Thus, by giving a differential voltage signal from the controller 103 to the transistors 110 and 111 the path of supply of current $Ic_{111}$ may be switched to obtain $$Ic_{111} = Ic_{108} \text{ (when } V_{B110} < V_{B111})$$

or $$Ic_{111} = 0 \text{ (when } V_{B110} > V_{B111})$$

As for the transistors 112 and 113 we may similarly obtain $$Ic_{113} = Ic_{109} \text{ (when } V_{B112} < V_{B113})$$

or $$Ic_{113} = 0 \text{ (when } V_{B112} > V_{B113})$$

Thus, the output current of the current amplifier 104 can be written as $$I_{104} = a \cdot I_{108} + b \cdot I_{109}$$

where $$a = \begin{cases} 1 \text{ when } V_{B110} < V_{B113} \\ 0 \text{ when } V_{B110} > V_{B111} \end{cases}$$

$$b = \begin{cases} 1 \text{ when } V_{B112} < V_{B113} \\ 0 \text{ when } V_{B112} > V_{B113} \end{cases}$$

that is, a and b are variables representing the switching state. Using the equation (2), $$I_{104} = \left( a \cdot \frac{A_{108}}{A_{107}} + b \cdot \frac{A_{109}}{A_{107}} \right) \cdot I_{101} \quad (4)$$

With the current amplifier 104 the gain can be set freely, and a value of gain can be switched one over to another according to a logic signal from the controller 103.

The current-to-voltage converter 105 converts the input current $-I_{104}$ to a voltage signal $V_{105}$.

Denoting the resistance of the feedback resistor 114 to be $R_{114}$, from the characteristics of the well-known current-to-voltage conversion circuit using the operational amplifier 115 we obtain $$V_{105} = R_{114} \cdot I_{104}$$

From the equations (4) and (5) the current-to-voltage conversion amplifier 102 consisting of the current amplifier 104 and current-to-voltage converter 105 has an input-output characteristic expressed as $$V_{105} = \left( a \cdot \frac{A_{108}}{A_{107}} + b \cdot \frac{A_{109}}{A_{107}} \right) \cdot R_{114} \cdot I_{101} \quad (6)$$

and is capable of setting and switching of the gain. Depending on the combination of a and b, the gain can be set to one of four values, $$0, \frac{A_{108}}{A_{107}} \cdot R_{114}, \frac{A_{109}}{A_{107}} \cdot R_{114}, \frac{A_{108} + A_{109}}{A_{107}} \cdot R_{114} \quad (7)$$

In this embodiment, only two circuits a and b are provided for switching for the sake of simplicity, but usually it is possible to switch $n$ circuits, and in this case the gain can be set to be one of $2^n$ values at the most.

The gain of each circuit can be set entirely freely; for instance, $2^n$ gain values may be set at a uniform interval as $2^0, 2^1, 2^2, \ldots, 2^{2u-1}$.

In the recording medium drive system, the dynamic range of the illumination light power has a span of approximately 1 to 10 while that of the reflectivity of the medium also has a span of approximately 1 to 10 as pointed out before in connection with the problems in the prior art. The dynamic range of the intensity of the reflected light, i.e., dynamic range of the output current $I_{101}$ of the photo-sensor 101 is the product of the spans noted above, i.e., it has a span of about 1 to 100. In an actual circuit, it is difficult to ensure high accuracy over the entire dynamic range as noted above.

In the recording medium drive system, each of the recording, reproduction and erasing modes and illumination light power are recognized, and the reflectivity of the medium in use is held as a code in the medium. It is possible to set a maximum gain and a minimum illumination light power level and read out these preset values from the medium. It is thus possible to estimate the intensity of reflected light from the read-out data.

The controller 103 calculates an optimum current-to-voltage conversion gain according to the photo-sensor output current $I_{101}$ obtained in this way and sets the calculated gain for the amplifier 102.

A practical example of gain setting for the amplifier 102 is as follows.

Illumination light power for reproduction: 0.4 to 2.0 mW
Illumination light power for recording: 5.0 to 10.0 mW
Illumination light power for erasing: 6.0 to 15.0 mW
Reflectivity of medium: 10 to 90%

Thus, denoting the sensitivity of the photosensor by K the photo-sensor output current $I_{101}$ is given as 0.04 to 13.5 K (i.e., maximum value = minimum value multiplied by 338)

For holding the dynamic range of estimation of the output voltage $V_{105}$ within a range of 1 to 10, the gain is set and switched as follows.

| Reflectivity of medium | Operation status and illumination light power | Reflected light power | Current amplifier gain | Output voltage $V_{105}$ |
|---|---|---|---|---|
| 10%~30% | Reproduction 0.4~1.0$^{mW}$ | 0.04~0.3$^{mW}$ | 9.0 | 0.36~2.7 × $KR_{114}$ |
|  | Reproduction 0.8~2.0$^{mW}$ | 0.08~0.6$^{mW}$ | 4.5 | 0.36~2.7 × $KR_{114}$ |
|  | Recording 5.0~10$^{mW}$ | 0.5~3.0$^{mW}$ | 0.75 | 0.375~2.25 × $KR_{114}$ |
|  | Erasing 6.0~15$^{mW}$ | 0.6~4.5$^{mW}$ | 0.6 | 0.35~2.7 × $KR_{114}$ |
| 30%~90% | Reproduction 0.4~1.0$^{mW}$ | 0.12~0.9$^{mW}$ | 3.0 | 0.36~2.7 × $KR_{114}$ |
|  | Reproduction 0.8~2.0$^{mW}$ | 0.24~1.8$^{mW}$ | 1.5 | 0.36~2.7 × $KR_{114}$ |
|  | Recording 5.0~10$^{mW}$ | 1.5~9.0$^{mW}$ | 0.25 | 0.375~2.25 × $KR_{114}$ |
|  | Erasing 6.0~15$^{mW}$ | 1.8~13.5$^{mW}$ | 0.2 | 0.36~2.7 × $KR_{114}$ |

In this way, the dynamic range, which has been 1 to 338 without gain switching, may be held within 0.36 to 2.7, i.e., 1 to 7.5.

In this example, the current amplifier gain can be switched to one of eight values depending on the reflectivity of the medium, operation mode and illumination light power, but it is possible to more finely divide the dynamic range or permit gain switching in dependence on the illumination light power alone. Further, in a system having a limited operation mode, it is possible to permit switching of the sole reflectivity. An example of gain setting in a system for switching the current amplifier gain in dependence on the operation mode or illumination light power will be shown below. This example is premised on the same assumption as in the previous example.

| Reflectivity of medium | Operation status and illumination light power | Reflected light power | Current amplifier gain | Output voltage $V_{105}$ |
|---|---|---|---|---|
| 10%~90% | Reproduction 0.4~2.4$^{mW}$ | 0.04~2.16$^{mW}$ | 2.5 | 0.1~5.4 × $KR_{114}$ |
| 10%~90% | Recording, Erasing 2.5~15.0$^{mW}$ | 0.25~13.5$^{mW}$ | 0.4 | 0.1~5.4 × $KR_{114}$ |

In this case, the dynamic range is 1 to 54. In a system, in which the current amplifier gain is switched in dependence on the reflectivity of the medium alone, the dynamic range may be held within 1 to 112.5 as follows.

| Reflectivity of medium | Operation status and illumination light power | Reflected light power | Current amplifier gain | Output voltage $V_{105}$ |
|---|---|---|---|---|
| 10%~30% | 0.4~15$^{mW}$ | 0.04~4.5$^{mW}$ | 3 | 0.12~13.5 × $KR_{114}$ |
| 30%~90% | 0.4~15$^{mW}$ | 0.12~13.5$^{mW}$ | 1 | 0.12~13.5 × $KR_{114}$ |

It will be seen the range of 1 to 338 may be reduced to one-third by simple division.

Figure 3:
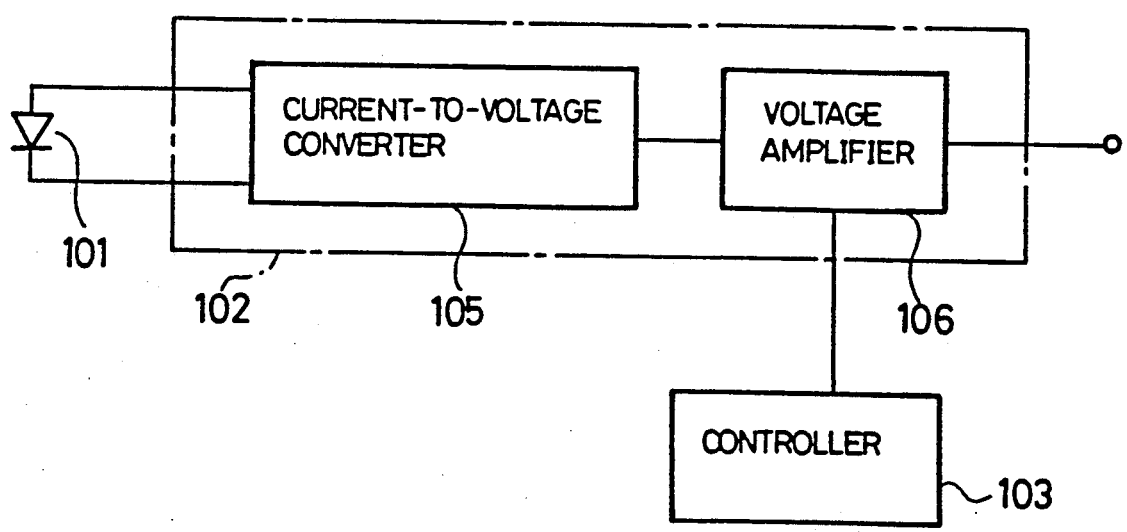
FIGS. 3 and 4 are a block diagram and a circuit diagram, respectively, showing a different embodiment of the system for driving a recording medium according to the invention.
Figure 4:
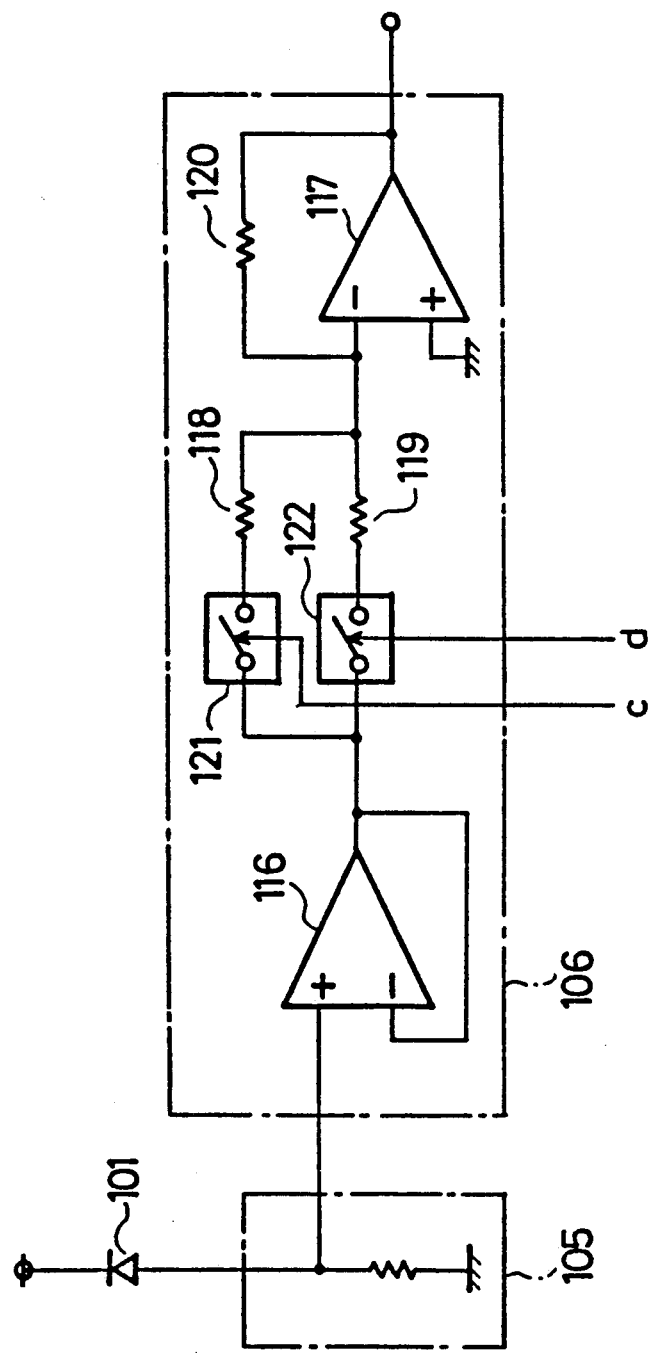
Figure 5:
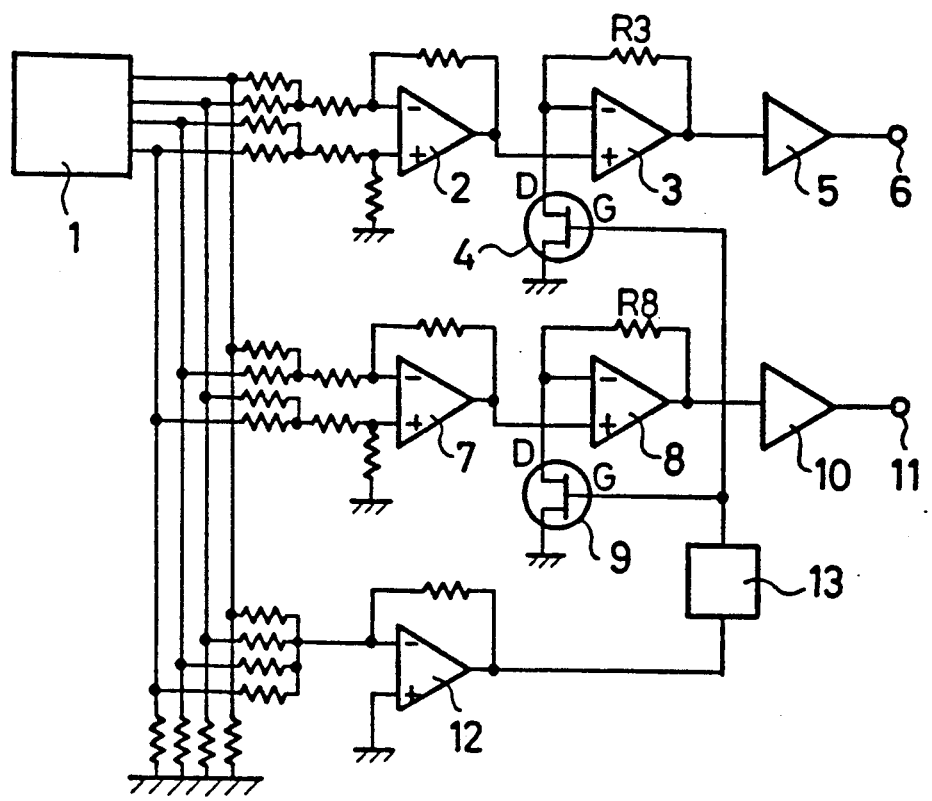
FIG. 5 is a circuit diagram showing a servo gain control circuit used in a prior art method of driving a recording medium.

Further, it is possible to construct the current-to-voltage conversion amplifier 102 with a current-to-voltage converter 105 and a variable gain voltage amplifier 106 as shown in FIG. 3. FIG. 4 shows an example of the detailed circuit arrangement in this case. A resistor 105 constitutes the current-to-voltage converter, and the variable gain voltage amplifier 106 includes a voltage-follower-connected operational amplifier 116, an inversion-amplifier-connected operational amplifier 117 and input resistors 118 and 119, a feedback resistor 120 analog switches 121 and 122 for setting the gain of the amplifier 117.

The operation of the circuit of FIG. 4 will now be described.

The output current $I_{101}$ of the photo-sensor 101 is converted by the resistor 105 having a resistance $R_{105}$ into a voltage $I_{101} \cdot R_{105}$. The output voltage of the voltage follower 116 also constitutes $I_{101} R_{105}$. The controller 103 provides logic signals c and d for gain switching as control signals to the analog switches 121 and 122.

$$c = \begin{cases} 1 \text{ to turn on analog switch 121} \\ 0 \text{ to turn off analog switch 121} \end{cases}$$

$$d = \begin{cases} 1 \text{ to turn on analog switch 122} \\ \text{to turn off analog switch 122} \end{cases}$$

Using the resistance $R_{118}$ and $R_{119}$ of the input resistors, the resistance $R_{120}$ of the feedback resistor and c and d noted above, the output voltage $V_{117}$ of the inversion amplifier 117 can be expressed as $$V_{117} = -I_{101} \cdot R_{104} \cdot \frac{R_{120}}{\left(\frac{R_{118}}{c} // \frac{R_{119}}{d}\right)} \quad (8)$$

$$= -I_{101} \cdot R_{105} \cdot \frac{d \cdot R_{118} + c \cdot R_{119}}{R_{118} \cdot R_{119}} \cdot R$$

In the voltage amplifier 106, the gain can be set freely depending on the resistance $R_{118}$, $R_{119}$ and $R_{120}$ and also it is possible to permit switching of a value of gain according to the logic signals c and d from the controller 103. In this example two input resistors and two analog switches are provided, it is possible to increase the number of switchable gain values by increasing the input resistors and analog switches.

Further, although not mentioned so far, the recording medium which requires a tracking servo or focusing servo is not limited to the optical disk or the magneto-optical disk, and various other forms of recording medium, e.g., optical cards, optical sheets and optical drums, are conceivable.

Further, the recording medium may consist of various conceivable materials, e.g., metals, oxides, those consisting of pigments and inorganic compounds, and organic compounds.

Further, the condenser lens is not limited to the spherical lens, and it is possible to use a non-spherical lens, a hologram lens, a diffraction grating, a Fresnel lens or any other member having a lens function to condense light as well.

Further, the sensor is not limited to the PIN photosensor, but it is possible to use a PN photodiode, an avalanche photo-diode, a PSD or a solar battery or any other member so long as a signal can be obtained as current data as well.

As has been described in the foregoing, according to the invention in a process of converting the sensor output current to a voltage, the conversion gain is switched by estimating the reflected light power from the reflectivity of the recording medium or illumination light power or both of these, so that the output voltage can be held within a desired range, thus permitting reduction of off-set noise or other external disturbance factors to obtain a highly accurate servo signal.

What is claimed is:

1. A method of providing an accurate error signal in an optical recording medium driver having different operation modes including recording, reproducing, and erasing data and further using recording media having different reflectivities, comprising the steps of:
    illuminating a recording surface of the recording media with a focused light beam for recording, reproducing, and erasing data;
    detecting light reflected from the recording surface and forming an error signal from the detected light;
    converting the error signal from a current to a voltage;
    estimating a power of the reflected light from a product of the reflectivity of the recording media and a power of the light beam; and
    selecting a gain of the converting step from one of a plurality of values using the estimated power.

2. The method of claim 1 wherein the step of detecting reflected light and forming an error signal includes forming a tracking error signal.

3. The method of claim 1 wherein the step of detecting reflected light and forming an error signal includes forming a focusing error signal.

4. The method of claim 1 further comprising the step of amplifying the error signal before converting the error signal from a current to a voltage.

5. The method of claim 1 further comprising the step of amplifying the error signal after converting the error signal from a current to a voltage.

6. The method of claim 1 wherein the error signal is a current signal.

7. The method of claim 4 or 5 wherein the step of amplifying includes amplifying using variable-gain.

8. The method of claim 1 wherein the step of estimating the power of the light beam further comprises:
    setting the power of the light beam to a minimum value and setting the gain of the converting step to a maximum value at the time of starting the recording medium driver;
    reading the reflectivity of the recording media and a required power of the light beam for recording, reproducing, and erasing data from data stored on the recording media; and
    multiplying the required power by the reflectivity to provide the estimated power for recording, reproducing, and erasing data.

9. A method of providing an accurate error signal in an optical recording medium driver having different operation modes including recording, reproducing, and erasing data and further using recording media having different reflectivities, comprising the steps of:
    illuminating a recording surface of the recording media with a focused light beam for recording, reproducing, and erasing data;
    detecting light reflected from the recording surface and forming an error signal from the detected light;
    converting the error signal from a current to a voltage; and
    selecting a gain of the converting step from one of a plurality of values according to the reflectivity of the recording media.

10. A method of providing an accurate error signal in an optical recording medium driver having different operation modes including recording, reproducing, and erasing data and further using recording media having different reflectivities, comprising the steps of:
    illuminating a recording surface of the recording media with a focused light beam for recording, reproducing, and erasing data;
    detecting light reflected from the recording surface and forming an error signal from the detected light;
    converting the error signal from a current to a voltage; and selecting a gain of the converting step from one of a plurality of values according to a power of the light beam.

11. An apparatus providing an accurate error signal in an optical recording medium driver having different operation modes including recording, reproducing, and erasing data and further using recording media having different reflectivities, comprising:
    means for illuminating a recording surface of the recording media with a focused light beam for recording, reproducing, and erasing data;
    means for detecting light reflected from the recording surface and means for forming an error signal from the detected light;
    means, coupled to the detecting means, for converting the error signal from a current to a voltage;
    means for estimating a power of the reflected light, including means for forming a product of the reflectivity of the media and a power of the light beam; and
    means for selecting a gain of the converting means from one of a plurality of values in response to the estimating means.

12. The apparatus of claim 11 wherein the detecting means includes means for detecting a tracking error signal.

13. The apparatus of claim 11 wherein the detecting means includes means for detecting a focusing error signal.

14. The apparatus of claim 11 further comprising means, connected to an output of the detecting means and having an output connected to an input of the converting means for amplifying the error signal.

15. The apparatus of claim 11 further comprising means, connected to an output of the converting means, for amplifying the error signal.

16. The apparatus of claim 14 or 15 wherein the amplifying means includes variable-gain amplifying means.

17. The apparatus of claim 16 wherein the converting means includes operational amplifier means.

18. The apparatus of claim 17 wherein the amplifying means includes current mirror means.

19. The apparatus of claim 16 wherein the amplifying means includes voltage amplifying means.

20. The apparatus of claim 11 wherein the selecting means includes controller means.

* * * * *